Feb. 22, 1966 B. V. BERKOVITS 3,236,239

DEFIBRILLATOR

Filed July 17, 1962 5 Sheets-Sheet 1

INVENTOR.
BAROUH V. BERKOVITS
BY
Beau, Brooks, Buckley & Beau
ATTORNEYS

Feb. 22, 1966 B. V. BERKOVITS 3,236,239

DEFIBRILLATOR

Filed July 17, 1962 5 Sheets-Sheet 2

INVENTOR.
BAROUH V. BERKOVITS

BY

Bean, Brooks, Buckley + Bean
ATTORNEYS

Feb. 22, 1966 B. V. BERKOVITS 3,236,239

DEFIBRILLATOR

Filed July 17, 1962 5 Sheets-Sheet 3

INVENTOR.

BAROUH V. BERKOVITS

BY

Bean, Brooks, Buckley & Bean

ATTORNEYS

INVENTOR.
BAROUH V. BERKOVITS
BY
Beau, Brooks, Buckley & Beau
ATTORNEYS

Feb. 22, 1966 B. V. BERKOVITS 3,236,239

DEFIBRILLATOR

Filed July 17, 1962 5 Sheets-Sheet 5

INVENTOR.
BAROUH V. BERKOVITS

BY

Bean, Brooks, Buckley & Bean
ATTORNEYS 3,236,239
DEFIBRILLATOR
Barouh V. Berkovits, Buffalo, N.Y., assignor to American Optical Company, Southbridge, Mass.
Filed July 17, 1962, Ser. No. 210,594
7 Claims. (Cl. 128—419)

This invention relates to electronic equipment for the treatment of cardiac disorders.

Classic treatment of most cardiac arrythmias involves the use of various drugs such as quinidine, procainamide, digitalis and the like. It has been known, also that electrical depolarizing impulses of rather high voltage and amperage can be effective in reverting certain arrythmias to normal sinus rhythm. However, due to the rather high mortality incident to the use of such depolarizing technique, it has heretofore been limited to use in conjunction with terminal events, for example ventricular fibrillation, and even here, usually only in those cases where the classic treatment, open chest cardiac resuscitation, is not indicated. In accord with the present invention, a therapeutic electrical stimulus derived from a charged capacitance is applied in controlled, timed relation to the cardiac cycle, it having been found that the high mortality previously associated with electrical depolarizing is due to application of the depolarizing impulse during one or both of two critical periods during the cardiac cycle. Of primary concern in connection with the present invention, then, is the provision of means enabling a physician to apply a capacitance discharge depolarizing impulse at a selected and precise point during the cardiac cycle which lies outside the above mentioned known critical areas. To achieve this effect, the present invention employs means for detecting the electrical activity of successive cardiac cycles and electrical depolarizing means controllable in timed relation to a known reference point occurring during a cardiac cycle as established from the means for detecting so as to intelligently apply the depolarizing impulse as aforesaid.

In general, this invention envisages equipment capable of providing electrical stimuli either directly or indirectly to a patient's heart for the purpose of reverting cardiac arrythmias.

Other objects and advantages of the invention will appear from the description hereinbelow and the accompanying drawings wherein.

Figure 1:
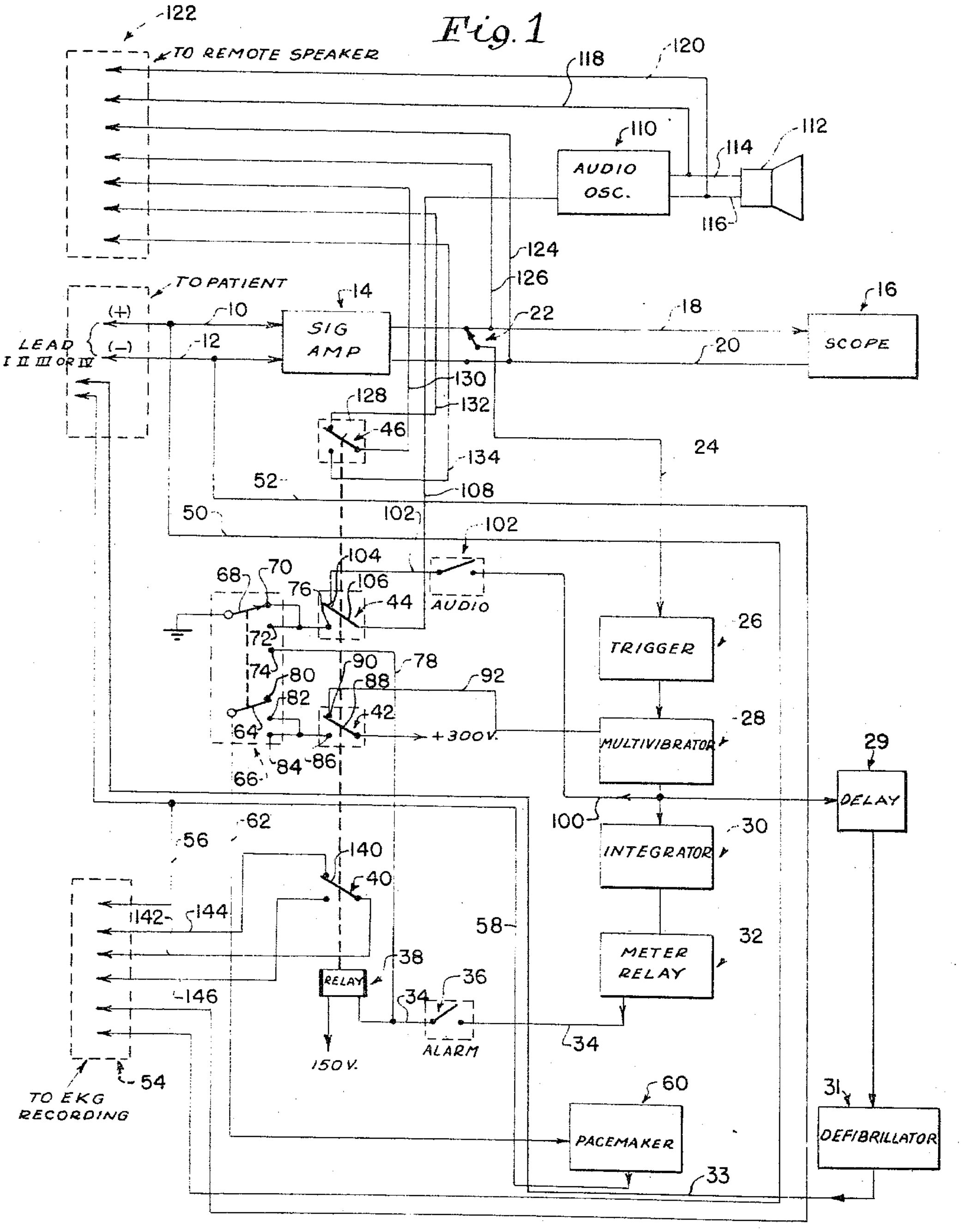
FIG. 1 is a block diagram, partially schematic, illustrating basic component parts of the present system.

The general principles of operation of a basic portion of the mechanism can be seen from a study of FIG. 1. In this figure, conductors 10 and 12 are adapted for connection to a selected one of the conventional leads of an electrocardiograph mechanism. Signals carried by the wires 10 and 12 are applied to a signal amplifier indicated generally by the reference character 14, the specific details of which will be discussed hereinbelow and the amplified signal thus obtained is transmitted to an oscilloscope 16 over the conductors 18 and 20. A manually controllable switch indicated generally by reference character 22 is provided for picking off the positive or negative side of the signal transmitted over the leads 18 and 20 and to apply the same, through conductor 24, to trigger mechanism indicated generally by reference character 26. The trigger mechanism 26 controls a modified multivibrator circuit indicated generally by the reference character 28 and the signals therefrom are applied to an integrator 30 and a meter relay 32 which two components constitute a frequency meter circuit to detect cessation of heartbeat or too-low frequency of heartbeat. Also, the pulse output from the multivibrator 28 may be selectively applied to a delay means 29, the output signal of which is connected to the defibrillator or stimulus means 31 for application, through the electrode 33, of a high intensity, short duration, high current impulse to the patient. Although not shown in FIG. 1, switch means 422 (FIG. 3) is provided both to prevent simultaneous stimuli from the pacemaker means 60 and the defibrillator means 31 and to permit application of the impulse from defibrillator means 31 only as selected by an attendant physician. The meter relay 32 is operative to energize the conductor 34 under the above conditions so that, if the manual alarm switch 36 is closed, the energized lead 34 will operate the relay designated generally by reference character 38. The relay 38 controls a series of switches indicated by reference characters 40, 42, 44 and 46 to cause certain circuit conditions to exist as hereinafter more particularly pointed out.

As shown, the two conductors 10 and 12 are also connected through leads 50 and 52 respectively to a suitable outlet or jack designated by the reference character 54 to a standard electrocardiograph recording mechanism. Also extending to this jack 54 is a lead 56 from the conductor 58 of the pacemaker assembly indicated generally by reference character 60. The pacemaker is controlled in its operation through the control lead 62 extending from the movable contact member 64 of a gang switch mechanism indicated generally by the reference character 66.

The switch 66 is manually controlled and includes in addition to the movable contact 64, the movable contact 68 ganged therewith for unison movement and each of which is movable to one of three positions. For the movable contact 68, there are three fixed contact members 70, 72 and 74, the first two of which are connected in common as in shown and extend to one of the fixed contacts 76 of the relay switch 44 and the latter of which extends through conductor 78 for connection to the conductor 34 leading to relay 38 so that when the manual switch 66 is in the position so that the movable contact 68 engages the fixed contact 74, relay 38 is energized to throw the pacemaker 60 into operation.

The movable contact 64 is engageable with any one of three fixed contacts 80, 82 and 84, the first of which is blank and the second two of which are bridged in common as shown to extend to the fixed contact 86 of the switch 42. The movable contact 88 of switch 42 is connected to a B supply and is operative to either engage the fixed contact 86 to energize the pacemaker 60 or to engage the fixed contact 90 to energize the multivibrator circuit 28, through the conductor 92. Thus, when the relay 38 is in the position shown in FIG. 1, the automatic heartbeat control mechanism represented by the circuitries 26, 28, 30, 32 and the pacemaker 60 when energized is operative whereas when the various relay switches 40, 42 and 44 are tripped from the position shown in FIG. 1, the pacemaker 60 is continuously in operation. Thus, the switch assembly 66 is settable for either automatic or manual application of the pacemaker 60 as well as to the position as shown in FIG. 1 which is a standby or off position since even if the relay 38 is tripped under the condition shown in FIG. 1, energization of pacemaker 60 will not result inasmuch as the movable contact 64 of switch 66 is on the dead contact 80.

In the connection between the modified multivibrator 28 and the integrator 30 there is a lead 100 extending to a manually controlled switch 102 that connects, in the position of the relay 38 as shown, through conductor 102 and the fixed contact 104 and the movable contact 106 of relay switch 44 to the lead 108 extending to the audio oscillator indicated by the reference character 110. Thus, the signals from the multivibrator 28 are used to trigger the audio oscillator 110 to produce an audio heartbeat signal through the speaker 112. At the same time, the output of the audio oscillator as indicated by the conductors 114 and 116 is fed through conductors 118 and 120 to a remote speaker jack indicated generally by the reference character 122. The remote speaker jack 122 is provided with two additional leads 124 and 126 which are connected to the signal amplifier output leads 18 and 20 previously described.

In the normal position of the relay 38, the movable contact 128 of the switch 46 thereof connects conductors 130 and 132 whereas in the opposite position of the switch 46, conductor 130 is connected to conductor 134, in coordination with operation or cessation of the multivibrator signal. Correspondingly, the relay switch 40 is operative through the movable contact 140 thereof to connect either the two leads 142 and 144 or the two leads 142 and 146.

From the above general description, it will be clear that the oscilloscope 16 provides means by which continuous monitoring of heart action may be obtained. At the same time, the heart action is automatically monitored by the combination of the trigger 26, the multivibrator 28, the integrator 30 and the meter relay 32. At any such time as this latter monitoring means is operative, an audible monitor in the form of the oscillator 110 and associated speaker 112 may be obtained, under control of the switch 102. Once the automatic monitoring system detects abnormal heartbeat frequency, it shuts itself off and simultaneously actuates the pacemaker 60 so that artificial stimulation and pacing of the heart action occurs. When it is desired to reset the automatic monitoring system and cease artificial heart stimulation, the switch 36 is simply opened momentarily. This will reset relay 38 and resume operation of the monitoring system 26, 28, 30 and 32. Then, when switch 36 is closed, the relay 38 will remain in the normal position as shown in FIG. 1 until such time as there is an absence of normal heart action.

*Signal amplifier*

Figure 4:
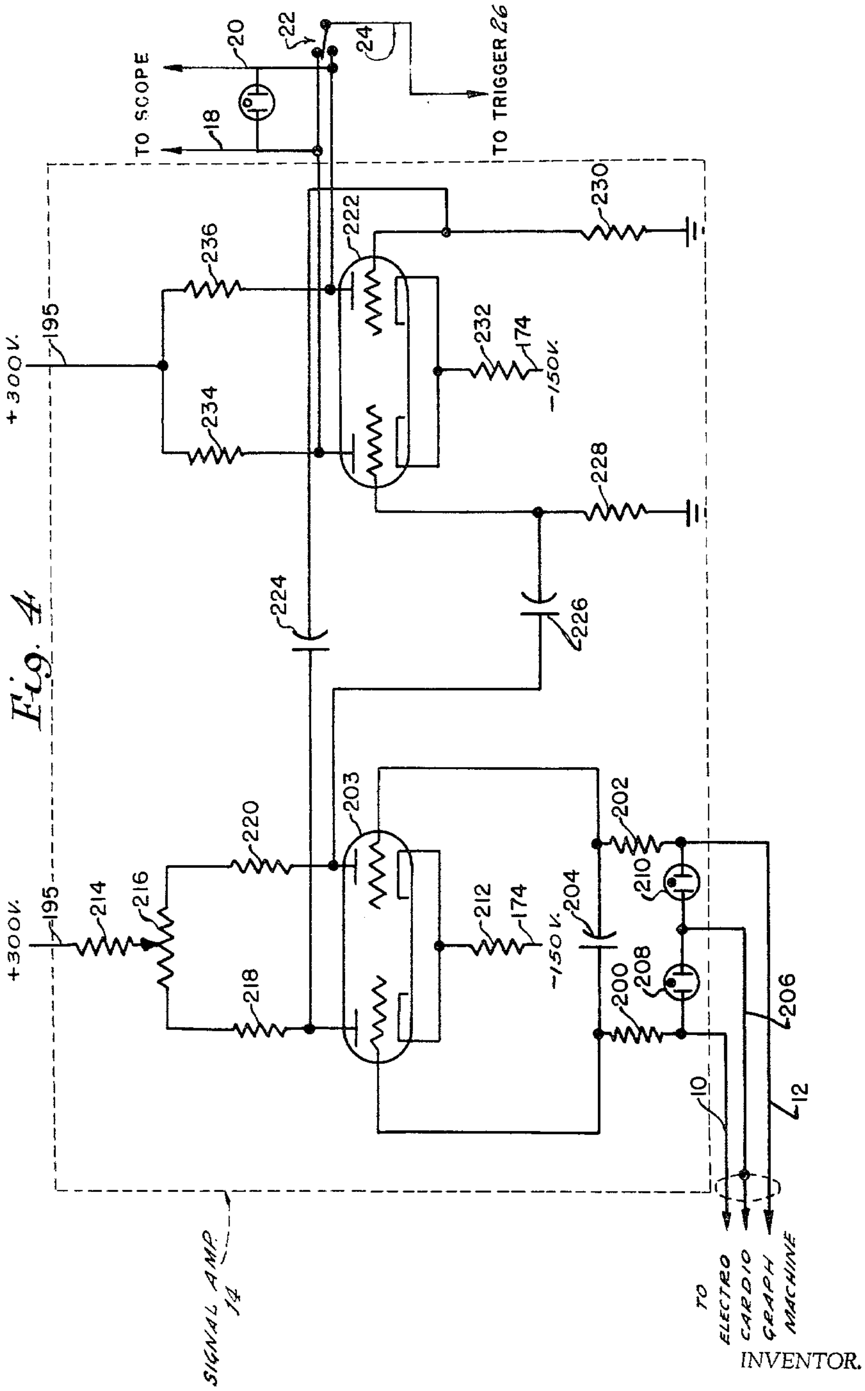
FIG. 4 is a schematic of the signal amplifier.

Although the signal amplifier 14 forms, per se, no part of the present invention, the preferred circuitry therefor is shown in FIG. 4. As shown, the electrocardiogram leads 10 and 12 are connected, through biasing resistors 200 and 202, to the grids of a dual triode 203, preferably a 12AX7. A suitable by-pass condenser 204 is connected between these grids to isolate them from undesirable transients and the ground 206 for leads 10 and 12 is provided with a pair of neon bulbs 208 and 210 connected as shown to provide a visual indication of the presence of a signal from the leads 10 and 12.

The cathodes of tube 203 are connected in common, through dropping resistor 212, to the negative supply line 174 whereas the plates are connected through dropping resistor 214, potentiometer 216 and load resistors 218 and 220 to the positive supply line 195. The amplifier signal is coupled to the grids of tube 222, preferably another 12AX7, through capacitors 224 and 226, these grids being suitably biased by resistors 228 and 230. The cathodes of this second amplifier are connected through resistor 232 to the negative supply line 174 while the plates are connected through load resistors 234 and 236 to the positive supply line 195. The amplified signal is transmitted over conductors 18 and 20 to the oscilloscope 16 and through switch 22 and conductor 24 to the trigger circuit 26.

*Trigger, multivibrator and integrator*

Figure 2:
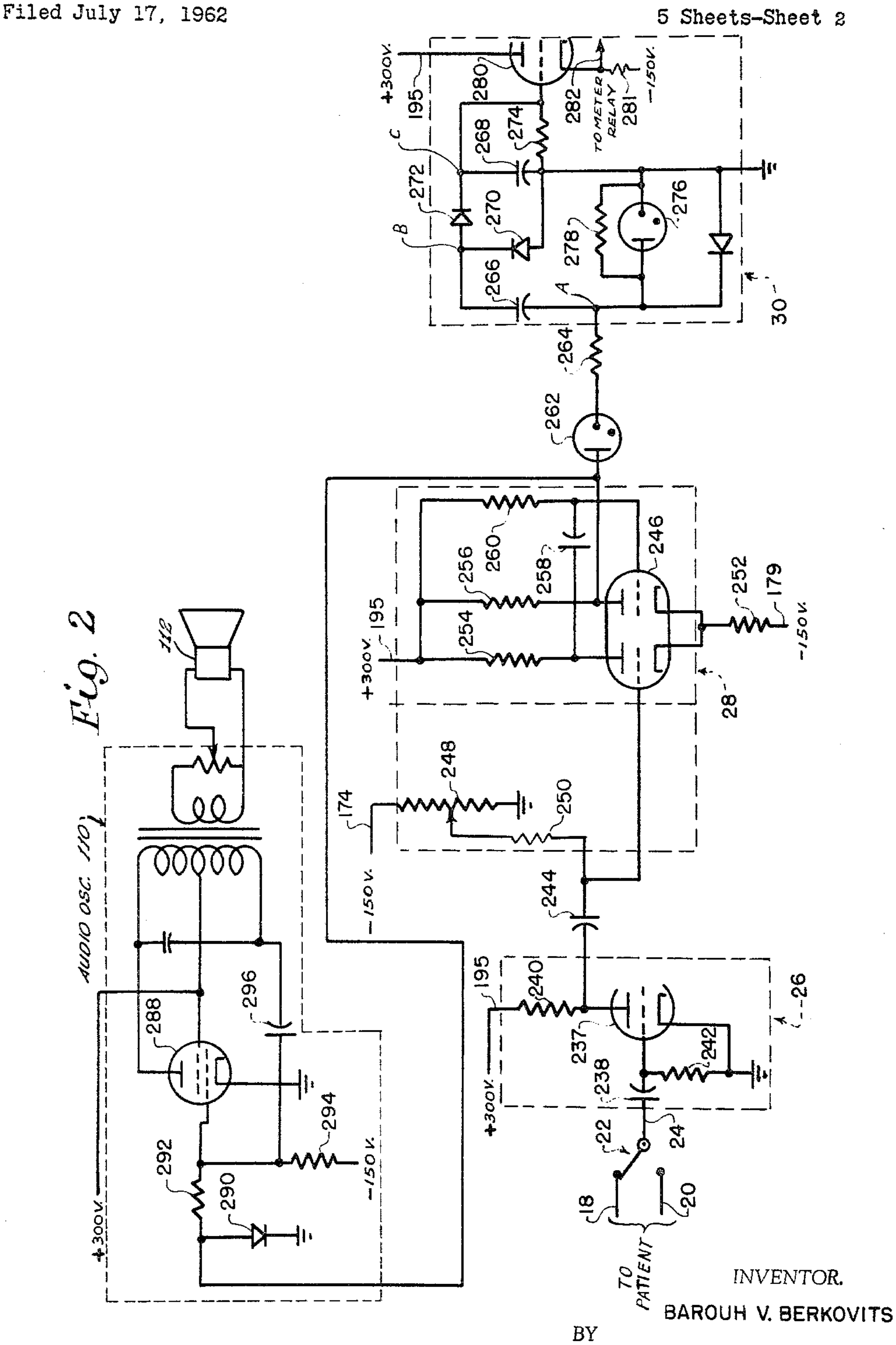
FIG. 2 is a schematic of a sub-assembly of the system as shown in FIG. 1.

The trigger, multivibrator and integrator circuits are shown in FIG. 2. In general, the trigger circuit operates to control the multivibrator 28 to supply a positive-going pulse to the integrator circuit once every cardiac cycle. The integrator circuit is operative, should the frequency of such pulses fall below a predetermined rate, to automatically control the pacemaker 60. Additionally, in the system herein contemplated, the output of the multivibrator 28 provides a reference point from which a timed defibrillating pulse may be applied to the patient. Thus, the trigger-multivibrator circuit not only controls the application of the pacemaker 60 but also controls the defibrillating means, hereinafter described in detail.

To appreciate the operation of the trigger, multivibrator and integrator, it will be understood that in one or more of the twelve conventional leads of an electrocardiograph mechanism, a peak voltage will occur during each cardiac cycle. In normal or sinus rhythm, the pulse P or P wave is indicative of sinoartrial node discharge, which impulse travels down the atrioventricular node (P–R interval) and activates the ventricles, the Q–R–S complex being indicative of ventricular activity. The T wave or recovery wave is indicative of the repolarizing wave as it moves back across the heart. In the conventional electrocardiograph leads, the R wave of the Q–R–S complex represents the type of peak voltage referred to hereinabove which can be used for triggering the multivibrator 28. The trigger, it will be seen, is essentially a signal-biased triode clipper comprising tube 237 having its grid coupled to conductor 24 by the capacitor 238 and resistor 242. The plate of this tube is connected to positive potential through the load resistor 240 and the cathode is grounded as shown. Since the cathode of the trigger tube 237 is grounded, the maximum amplitude peak of the input signal will therefore be clamped to zero potential so that the major portion of the signal will be below cutoff, permitting the trigger tube 237 to conduct only during a portion of the maximum amplitude peak. Dependent upon the condition of the heart being monitored and the particular electrocardiograph lead used, the maximum amplitude peak during each heartbeat may be either positive-going or negative-going. Switch 22 is positioned to select the most favorable condition to produce only one output pulse from the trigger tube for each heartbeat.

The output of the trigger is coupled to the grid of the left-hand side of multivibrator tube 246 by means of the capacitor 244, the resistor 250 and a portion of the potentiometer 248. Normally, the left-hand grid is biased below cutoff by the potentiometer 248 and adjustment of this potentiometer is made to select that portion of the input which will drive the left-hand side of the multivibrator tube 246 conductive to produce the positive multivibrator output pulse at the right-hand side of the tube. The left and right-hand plates of the multivibrator tube 246 are connected to the positive supply line 195 through the load resistors 254 and 256 and the cathodes are connected to the negative supply line 179 through the resistor 252. The right-hand side of the multivibrator tube 246 is normally conductive by virtue of its grid being connected to the positive supply line 195 through the resistor 260. When the left-hand side of the tube 246 is driven conductive as aforesaid, the corresponding plate potential drop will drive the right-hand side of the tube, by means of the coupling capacitor 258, non-conductive.

*Integrating circuit*

It will be seen that the square wave output of the modified multivibrator 28 is at the same frequency as the patient's heartbeat. The purpose of the integrator 30 is to provide a voltage output whose amplitude is proportioned to the frequency of the modified multivibrator output, so that by coupling this output to a suitable meter relay operative to actuate relay 38 whenever the output of the integrating circuit falls below a predetermined range, operation of the pacemaker 60 may be automatically coordinated with failure of the patient's heartbeat rate to fall within the predetermined frequency range.

As shown in FIG. 2, the output of the multivibrator 28 is coupled to the integrator through the gas filled diode 262 and the dropping resistor 264. The diode 262 fires at every positive output pulse of the multivibrator 28 and the square wave pulses appearing at junction A are clipped by the gas filled diode 276 and its associated resistor 278. The capacitor 266 charges through the diode 270 and, as will be apparent, whenever the potential at point B becomes more positive than the potential at point C, the capacitors 266 and 268 will be placed in charge-exchanging relation across the diode 272.

The constant amplitude positive pulses appearing at point B are of fixed duration as established by the multivibrator 28, the intervals between such pulses being variable in accord with the heartbeat frequency. During such intervals between pulses, the potential at point C is decaying exponentially toward zero by virtue of the time constant of the capacitor 268 and the resistor 274. Thus, the potential existing at point C when a positive-going pulse appears at point B will be dependent upon the elapsed time between such pulse and the last preceding pulse, as established by the heartbeat frequency. The net effect will be to produce a D.C. level voltage at junction C which is proportional to the heartbeat frequency. This voltage is applied to the grid of the cathode follower tube 280 having a load resistor 281 and a conductor 282 extending to the previously mentioned meter relay. When the output of this tube 280 falls below a predetermined value, the meter relay will be actuated to energize relay 38, see FIG. 1.

*Audio oscillator*

The audio oscillator 110 is of conventional form and is shown in FIG. 2 as using a 6AQ5 tube 288 connected as shown. A diode 290 is used to limit the amplitude of the square wave input from the modified multivibrator 246 and correct amplitude to cause oscillation during such input is further controlled by dropping resistor 292. Grid bias is provided by bias resistor 294 and capacitor 296 is also connected to the grid. The audio oscillator is operative at any such time as switch 102 is closed and relay 38 is deenergized.

*Defibrillator*

As has been mentioned hereinabove, it is beneficial for reverting certain cardiac arrythmias to subject the heart muscle to a high intensity, short duration, high current impulse. For example, in the treatment of ventricular fibrillation, it has been found that the application of an impulse as stated above by means of a pair of precordial electrodes may successfully revert such condition. However, as it is also stated hereinabove, it is important to time the application of such impulse with respect to the cardiac cycle.

Figure 3:
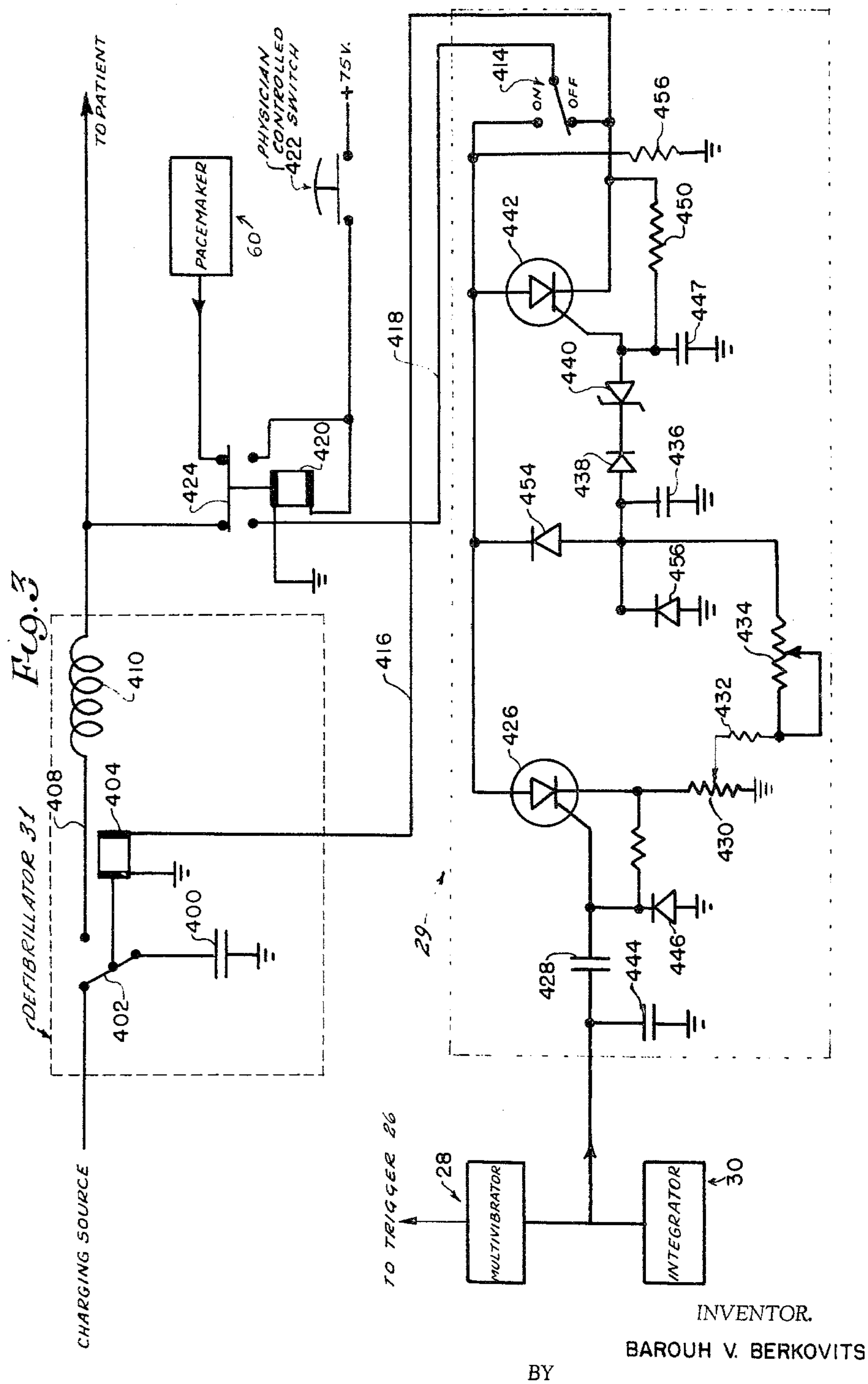
FIG. 3 is a schematic of a defibrillator and defibrillator synchronizer which may be used in association with the system shown in FIG. 1.

As shown in FIG. 3, the defibrillator consists essentially of the capacitor 400 which is selectively connected by movable relay switch 402 to either a suitable charging source or a conductor for discharge to the patient. The switch 402 is controlled by the relay 404 and the patient-connected conductor 408 includes the coil 410 as shown. When the delay means or synchronizer 29 is turned to the off position by means of switch 414, direct connected is made between conductors 416 and 418 so that control of relay 404 is achieved by the relay mechanism 420, in turn controlled by a suitable normally open switch 422 which may be manual or foot operated. The movable contact 424 of relay 420 normally completes the circuit from the pacemaker 60 to the patient and the movable contact 424 thus disconnects the pacemaker from the patient at any time during which the defibrillating impulse is being applied to the patient.

*Defibrillator synchronizer*

In order to accurately time the defibrillating impulse with respect to the cardiac cycle, the delay means or synchronizer 29 is used in conjunction with the defibrillator. In this fashion, the operator may successfully avoid those portions or periods of the cardiac cycle during which application of the defibrillating impulse would be fatal. As shown in FIG. 3, the control electrode of the silicon controlled rectifier 426, preferably a 2N1595, is coupled through capacitor 428 to the output of the multivibrator 28. The characteristics of rectifier 426 are such that it will conduct heavily (switch 414 being "on") in response to the presence of the positive input signal. The movable tap of the potentiometer 430 constitutes, with the resistor 432 and variable resistor 434, a variable resistance connection to the capacitor 436 so that the time constant of this portion of the circuit is variable for purposes hereinafter apparent. The capacitor 436 is coupled, through diode 438 and Zener diode 440 to the control electrode of the silicon controlled rectifier 442 preferably a 2N1595. This rectifier, like the rectifier 426, has its anode connected to conductor 418 through switch 414 and cathode is connected to conductor 416.

Thus, it will be apparent that whereas the rectifier 426 will fire in synchronization with the output of the multivibrator 28, the rectifier 442 will fire with delay by an amount of time determined by the time constant of the resistor chain 430, 432, 434 and the capacitor 436. Since, as aforesaid, this resistor chain is variable, the precise time of firing of rectifier 442 may be controlled thereby so as to apply the stimulating pulse in desired timed relation to the pulse triggering the multivibrator 28. Therefore, by positioning switch 414 in the "on" position and depressing switch 422, variable resistor 434 being adjusted for desired delay, the stimulating pulse will be applied at the desired instant.

To prevent firing the rectifiers 426 or 442 by parasitic capacitance when the power supply voltage is applied through switch 414 upon energization of relay 420, the capacitors 444 and 447 are connected as shown. The firing points of these two rectifiers are controlled by the resistors 448 and 450 respectively, diode 446 being connected to pass any negative transients. The two diodes 452 and 454 and the resistor 456 are for the purpose of restoring the capacitor 436.

The values of the circuit components in the several figures of the drawings are as follows:

FIG. 2

Resistors:

| | | |
|---|---|---|
| **240** | | 220K |
| **242** | meg | 1 |
| **248** | | 250K |
| **250** | meg | 1 |
| **252** | | 33K |
| **254** | | 100K |
| **256** | | 100K |
| **260** | meg | 1 |
| **264** | | 10K |
| **278** | | 220K |
| **279** | meg | 2 |
| **281** | | 100K |
| **292** | | 47K |
| **294** | meg | 3.3 |

| | | |
|---|---|---|
| Capacitors: | | |
| 238 | μf | .47 |
| 244 | μf | .1 |
| 258 | μf | .1 |
| 266 | μf | .1 |
| 268 | μf | 5 |
| 296 | μf | .1 |
| Tubes: | | |
| 237, 280 | | 12AX7 |
| 246 | | 12AT7 |
| 262 | | 10501-15 |
| 270 | | 1N2069 |
| 272 | | 1N2069 |
| 274 | | 1N70 |
| 276 | | 10501-18 |
| 288 | | 6AQ5 |
| 290 | | 1N2069 |

FIG. 3

| | | |
|---|---|---|
| Resistors: | | |
| 430 | ohms | 1000 |
| 432 | do | 100 |
| 434 | do | 20 |
| 448 | do | 4700 |
| 450 | do | 1000 |
| 456 | do | 1000 |
| Capacitors: | | |
| 400 | μf | 16 |
| 428 | μf | 0.1 |
| 436 | μf | 100 |
| 444 | μf | .005 |
| 447 | μf | .005 |
| Tubes: | | |
| 426 | | 2N1595 |
| 438 | | 1N69A |
| 440 | | RS6 |
| 442 | | 2N1595 |
| 446 | | 1N69A |
| 452 | | 1N69A |
| 454 | | 1N2069 |
| Inductance | millihenries | 100 |
| | ohms | —20 |

FIG. 4

| | | |
|---|---|---|
| Resistors: | | |
| 200 | | 10K |
| 202 | | 10K |
| 212 | meg | 1 |
| 214 | | 220K |
| 216 | meg | 1 |
| 218 | | 470K |
| 220 | | 470K |
| 228 | meg | 1 |
| 230 | meg | 1 |
| 232 | | 100K |
| 234 | | 220K |
| 236 | | 220K |
| Capacitors: | | |
| 204 | μf | 0.15 |
| 224 | μf | 0.47 |
| 226 | μf | 0.47 |
| Tubes: | | |
| 203 | | 12AX7 |
| 208 | | NE-2 |
| 210 | | NE-2 |
| 222 | | 12AX7 |

Figures 5, 6, 7, 8, 9:
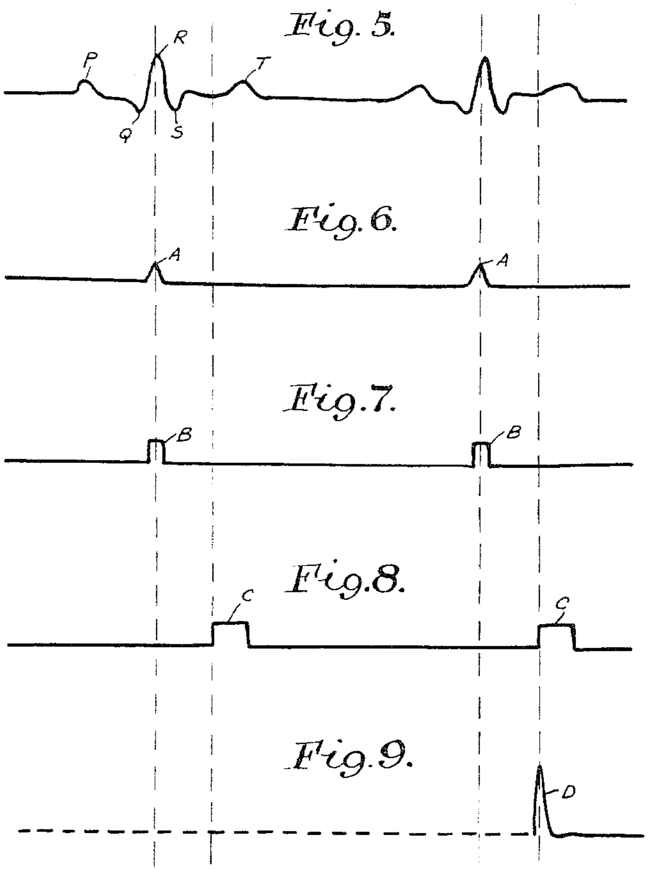
FIG. 5 is a waveform illustrative of normal sinus rhythm.
FIG. 6 is a waveform showing the output of the trigger synchronized with the R waves of FIG. 5.
FIG. 7 is a waveform showing the output of the multivibrator triggered by and synchronized with the waveform of FIG. 6.
FIG. 8 is a waveform showing the output of the delay means.
FIG. 9 is a waveform showing the output of the defibrillator.

With reference now more particularly to FIG. 1 and FIGS. 5–9 inclusive, FIG. 5 illustrates a normal sinus rhythm waveform as it may be picked up by a conventional lead from the electrocardiograph machine. This signal, when amplified by the signal amplifier 14, is applied in the form shown in FIG. 5 to the conductor 24 in FIG. 1 for application to the trigger 26. The trigger 26 is adjusted to produce output pulses A as indicated in FIG. 6 which are synchronized with peaks of the waveform applied through the conductor 24. In the particular case shown, the peaks are the R waves of the amplified electrocardiograph signal and the pulses A are thus coincidental with such R waves. The waveform output of FIG. 6 is applied to the multivibrator 28 and this multivibrator, in turn, produces output pulses B which are synchronized with the pulses A of FIG. 6. The output of the multivibrator 28 when applied to the delay means 29 produces a delayed pulse output C (FIG. 8) from such delay means 29 for application to the defibrillator 31. If, now, the physician closes the switch 422 (FIG. 3—switch 414 being in the "on" position) at some time prior to the second pulse C shown in FIG. 8, the defibrillating pulse D will be applied through the electrode 33 to the patient. The pulse D is, of course, the waveform resulting from the discharge of the capacitor 400 through the inductor 410 (FIG. 3).

From the above, it will be appreciated that a defibrillating pulse D as shown in FIG. 9 will be applied in timed relation to the cardiac cycle as represented by the waveform of FIG. 5. The trigger 26 and multivibrator 28 form a pulse generating means producing output pulses B (FIG. 7) synchronized with peaks occurring during successive cardiac cycles; the peaks occurring at the R waves in the particular instance shown. The delay means 29 produces a delayed output pulse C which, in turn, may actuate the defibrillating means if the switch 422 (FIG. 3) is closed by the physician; provided also that the switch 414 as shown in FIG. 3 is in the "on" position. It will be appreciated that the discharge of the defibrillator causes all heart activity to be extinguished for a short time subsequent to the application of the defibrillating pulse D, such time ordinarily being in the order of several seconds. Thereafter, normal heart rhythm should occur.

I claim:

1. A device useful in cardiac therapy, comprising in combination,
   pulse generating means adapted to be connected to a patient for detecting peak voltages in successive cardiac cycles indicative of heart muscle activities which are similar in such successive cardiac cycles and said pulse generating means having output pulses coinciding with said peak voltages,
   an electrode adapted to be electrically connected to a patient for electrical stimulus of the heart muscle,
   a defibrillator including a capacitor, a charging source for said capacitor, and switch means movable between one position connecting said capacitor to said charging source and a second position connecting said capacitor to said electrode,
   delay means for selectively actuating said switch means from said one position thereof to said second position thereof in predetermined timed relation subsequent to one of said output pulses of the pulse generating means,
   and a normally open physician-controlled switch for controlling actuation of said switch means to said second position thereof by said delay means.

2. A device according to claim 1 wherein said defibrillator includes an inductor connected to said electrode and which is placed in series with said capacitor when said switch means is in said second position thereof.

3. The device according to claim 2 wherein said capacitor has a value of about 16 microfarads and said inductor has a value of about 100 millihenries.

4. A device useful in cardiac therapy, comprising in combination,
   pulse generating means adapted to be connected to a patient for detecting peak voltages in successive cardiac cycles indicative of heart muscle activities which are similar in such successive cardiac cycles and said pulse generating means having output pulses coinciding with said peak voltages,
   an electrode adapted to be electrically connected to a patient for electrical stimulus of the heart muscle, a defibrillator including a capacitor, a charging source for said capacitor, an inductor, and switch means movable between one position connecting said capacitor to said charging source and a second position connecting said capacitor, said inductor and said electrode in series, delay means for selectively actuating said switch means from said one position thereof to said second position thereof in predetermined timed relation subsequent to one of said output pulses of the pulse generating means, and a normally open physician-controlled switch for controlling actuation of said switch means to said second position thereof by said delay means.

5. The device according to claim 4 wherein said capacitor has a value of about 16 microfarads and said inductor has a value of about 100 millihenries.

6. A device useful in cardiac therapy, comprising in combination, pulse generating means adapted to be connected to a patient for detecting peak voltages in successive cardiac cycles indicative of heart muscle activities which are similar in such successive cardiac cycles and said pulse generating means having output pulses substantially coinciding with said peak voltages, electrode means to be electrically connected to the patient, a defibrillator including a capacitor, a charging source for said capacitor, and means normally coupling said capacitor to said charging source whereby to charge said capacitor, said means including a switch actuable to couple said capacitor to said electrode means whereby to discharge the capacitor through the electrode means into the patient's heart, actuating means for actuating said switch to couple said capacitor to said electrode means in predetermined timed relation to a peak voltage produced by one of said cardiac cycles in response to an output pulse from said pulse generating means, and a physician-controlled switch for selectively coupling said actuating means to said pulse generating means to control actuation of the first mentioned switch by said actuating means.

7. A device useful in cardiac therapy, comprising in combination, pulse generating means adapted to be connected to a patient for detecting peak voltages in successive cardiac cycles indicative of heart muscle activities which are similar in such successive cardiac cycles and said pulse generating means having output pulses substantially coinciding with said peak voltages, electrode means to be electrically connected to the patient, a defibrillator including a capacitor, a charging source for said capacitor, and switch means having a normal condition in which said capacitor is coupled to said charging source without being coupled to said electrode means whereby to charge said capacitor, said switch means having a second condition in which said capacitor is coupled to said electrode means whereby to discharge the capacitor through the electrode means into the patient's heart, actuating means for actuating said switch means to said second condition thereof to couple said capacitor to said electrode means in predetermined timed relation to a peak voltage produced by one of said cardiac cycles in response to an output pulse from said pulse generating means, and a physician-controlled switch for selectively coupling said actuating means to said pulse generating means to control actuating of said switch means to said second condition thereof by said actuating means.

References Cited by the Examiner

UNITED STATES PATENTS

| | | | |
|---|---|---|---|
| 2,558,270 | 6/1951 | Reiter | 128—423 |
| 2,713,120 | 7/1955 | Mostofsky | 128—423 X |
| 2,815,748 | 12/1957 | Boucke | 128—2.05 |
| 2,848,992 | 8/1958 | Pigeon | 128—2.05 |
| 2,864,371 | 12/1958 | Parodi | 128—419 |
| 2,865,365 | 12/1958 | Newland | 128—2.05 |
| 2,993,178 | 7/1961 | Burger | 331—146 |
| 3,024,783 | 3/1962 | Timcke | 128—2 |
| 3,050,695 | 8/1962 | Du Vall | 331—52 |
| 3,052,233 | 9/1962 | Veling | 128—2.1 |
| 3,109,430 | 11/1963 | Tischler | 128—422 |
| 3,129,704 | 4/1964 | Burt | 128—2.1 |

FOREIGN PATENTS

| | | |
|---|---|---|
| 826,766 | 1/1960 | Great Britain. |

OTHER REFERENCES

Lillehei: JAMA, pp. 2006–2010, Apr. 30, 1960.

AO ad in Journal Thoracic and Card. Surgery, February 1962.

Dallons publication, Model CDPM–X1, Nov. 16, 1961

New York Times, p. 64M, col. 1, May 1962.

Lown: "New Method," pp. 548–555 of JAMA, Nov. 3, 1962.

RICHARD A. GAUDET, *Primary Examiner.*

JORDAN FRANKLIN, LOUIS R. PRINCE, *Examiners.*